(12) United States Patent
Feng

(10) Patent No.: US 11,770,150 B2
(45) Date of Patent: Sep. 26, 2023

(54) MOBILE PHONE SHELL WITH CAMERA PROTECTION DEVICE

(71) Applicant: Shenzhen Yinhao Technology Co., Ltd., Shenzhen (CN)

(72) Inventor: Mou Feng, Yangjiang (CN)

(73) Assignee: Shenzhen Yinhao Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/954,604

(22) Filed: Sep. 28, 2022

(65) Prior Publication Data

US 2023/0014496 A1   Jan. 19, 2023

(51) Int. Cl.
*H04B 1/3888* (2015.01)
*A45C 11/00* (2006.01)
*A45C 11/38* (2006.01)

(52) U.S. Cl.
CPC ............ *H04B 1/3888* (2013.01); *A45C 11/00* (2013.01); *A45C 11/38* (2013.01); *A45C 2011/002* (2013.01)

(58) Field of Classification Search
CPC ....... H04B 1/3888; A45C 11/00; A45C 11/38; A45C 2011/002
See application file for complete search history.

(56) References Cited

U.S. PATENT DOCUMENTS 10,317,776 B2 *   6/2019   Gustaveson, II ...... H04N 23/57

FOREIGN PATENT DOCUMENTS

| CN | 203278945 U | 11/2013 |
| CN | 205105261 U | 3/2016 |

* cited by examiner

*Primary Examiner* — Lester G Kincaid
*Assistant Examiner* — Maryam Soltanzadeh

(57) ABSTRACT

Provided is a mobile phone shell with a camera protection device, comprising a mobile phone shell body, and further comprising a camera slide base fixed on the mobile phone shell body and a camera lens protection cover capable of sliding in the camera slide base; the camera slide base comprises two sliding slots arranged oppositely and positioning bulges arranged at two opposite ends in the sliding slot; and each side of the camera lens protection cover is provided with a positioning slot matched with the positioning bulge. The mobile phone shell achieves a function of protecting a mobile phone camera through an assembly structure of the camera lens protection cover and the camera slide base, thus preventing the camera from being scraped or smashed.

6 Claims, 5 Drawing Sheets

MOBILE PHONE SHELL WITH CAMERA PROTECTION DEVICE

TECHNICAL FIELD

The application belongs to the field of digital 3C accessories, and particularly relates to a mobile phone shell with a camera protection device.

BACKGROUND

A mobile phone protection cover protects a mobile phone from collision damage in daily use. With the development of mobile phone, a shooting function of the mobile phone is becoming more and more advanced. Since a camera has an increasingly higher cost ratio in the mobile phone, a demand for protecting the camera is becoming higher.

In order to better protect the camera and prevent the camera from being scratched or smashed, it is necessary to design a mobile phone shell with a camera protection device.

SUMMARY

The application aims to provide a mobile phone shell with a camera protection device, which prevents a camera from being scraped or smashed.

The application provides a mobile phone shell with a camera protection device, comprising a mobile phone shell body, and further comprising a camera slide base fixed on the mobile phone shell body and a camera lens protection cover capable of sliding in the camera slide base, wherein the camera slide base comprises two sliding slots arranged oppositely and positioning bulges arranged at two opposite ends in the sliding slot; and each side of the camera lens protection cover is provided with a positioning slot matched with the positioning bulge.

Further, the mobile phone shell body is provided with a bulge area and an opening arranged in the bulge area and corresponding to an area in which a mobile phone camera is located.

Further, the bulge area is arranged in an upper position the mobile phone shell body, and the camera slide base is transversely fixed in the upper position the mobile phone shell body.

Further, the camera slide base further comprises a base body, a camera window arranged on the base body and corresponding to the opening, and a window edge connected around the base body and in a U shape, and the sliding slots are arranged on two opposite sides of the base body and located in a part of the window edge.

Further, the camera slide base further comprises blocking arcs located at two ends of each sliding slot and located outside the corresponding positioning bulge.

Further, the camera lens protection cover is provided with clamping edges on two sides, and the positioning slots are located at two ends of each clamping edge.

The application achieves a function of protecting the mobile phone camera through an assembly structure of the camera lens protection cover and the camera slide base, thus preventing the camera from being scraped or smashed.

DETAILED DESCRIPTION

In order to make the objects, the technical solutions, and the advantages of the application clearer, the application is further described in detail hereinafter with reference to the drawings and the embodiments. It should be understood that the specific embodiments described herein are only used for explaining the application and are not intended to limit the application.

Figure 1:
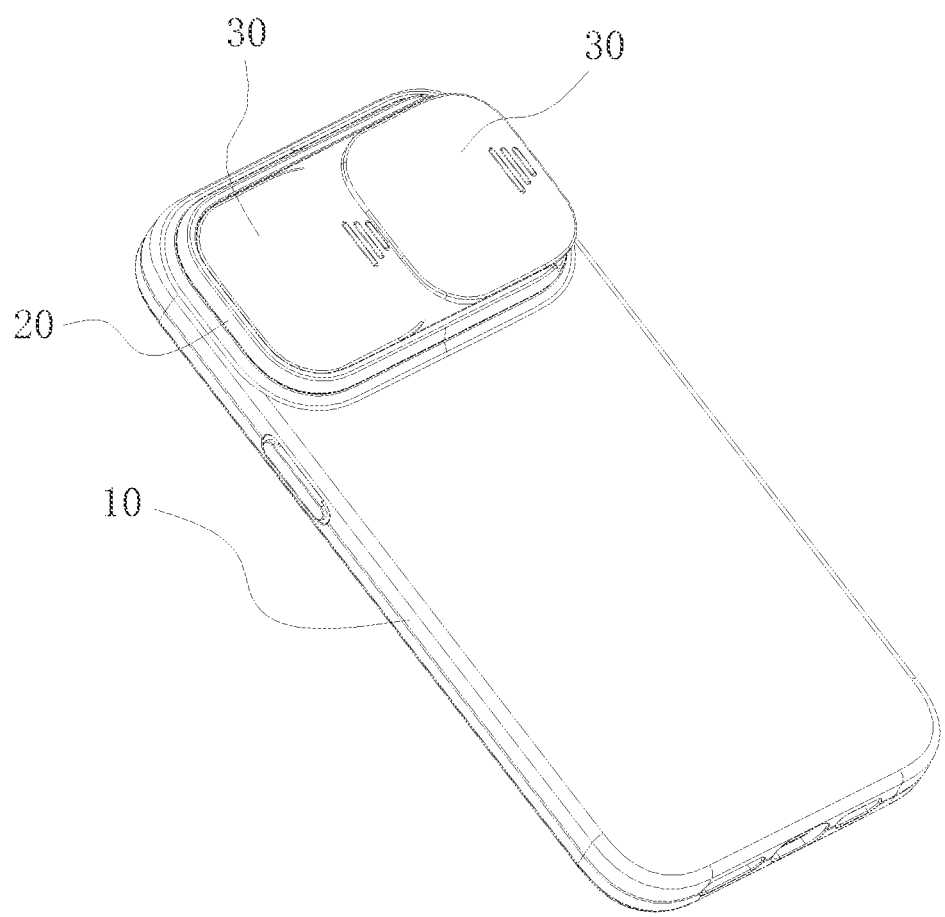
FIG. 1 is a schematic structural diagram of a mobile phone shell with a camera protection device of the application.

As shown in FIG. 1, the application discloses a mobile phone shell with a camera protection device, which comprises a mobile phone shell body 10, a camera slide base 20 fixed on the mobile phone shell body 10 and a camera lens protection cover 30 capable of sliding in the camera slide base 20.

Figure 2:
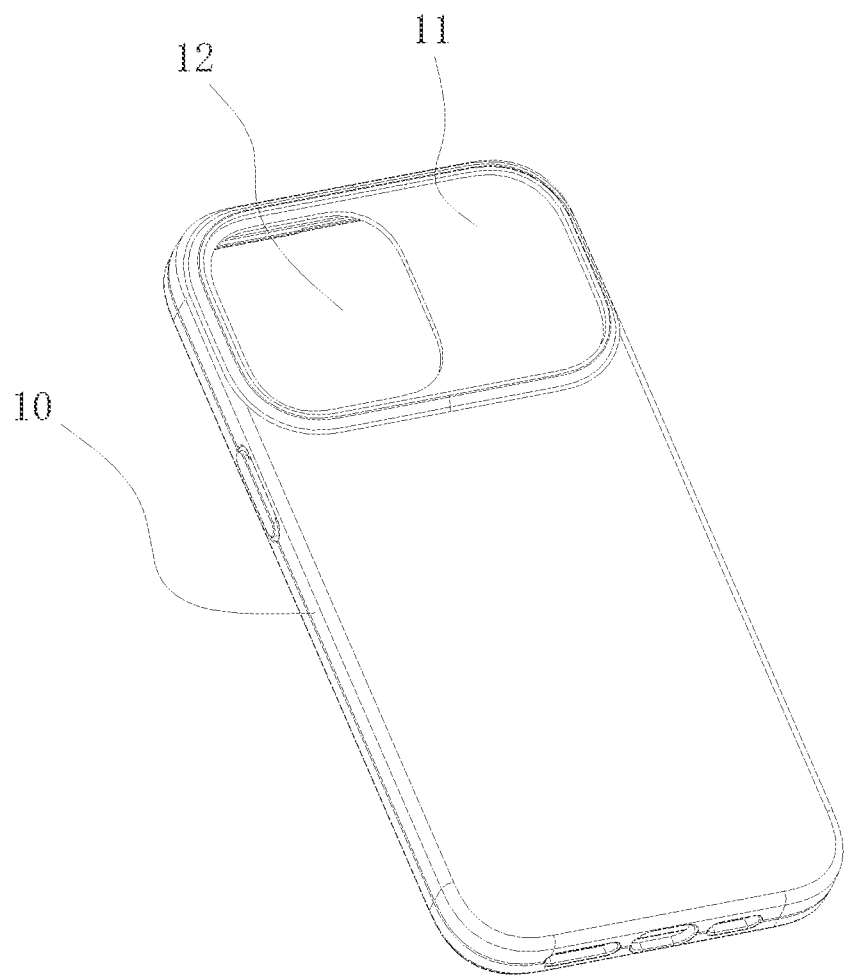
FIG. 2 is a schematic diagram of a single structure of a mobile phone shell body of the mobile phone shell with the camera protection device of the application.

As shown in FIG. 2, the mobile phone shell body 10 is provided with a bulge area 11 and an opening 12 arranged in the bulge area 11 and corresponding to an area in which a mobile phone camera (not shown in the drawing) is located.

Taking an iPhone and a Xiaomi phone as examples, the camera is arranged in an upper right position on a back surface of the phone, so that the bulge area 11 is arranged in an upper position of the mobile phone shell body 10, and a length of the bulge area 11 is basically equal to a width of the mobile phone shell body 10.

Figure 3:
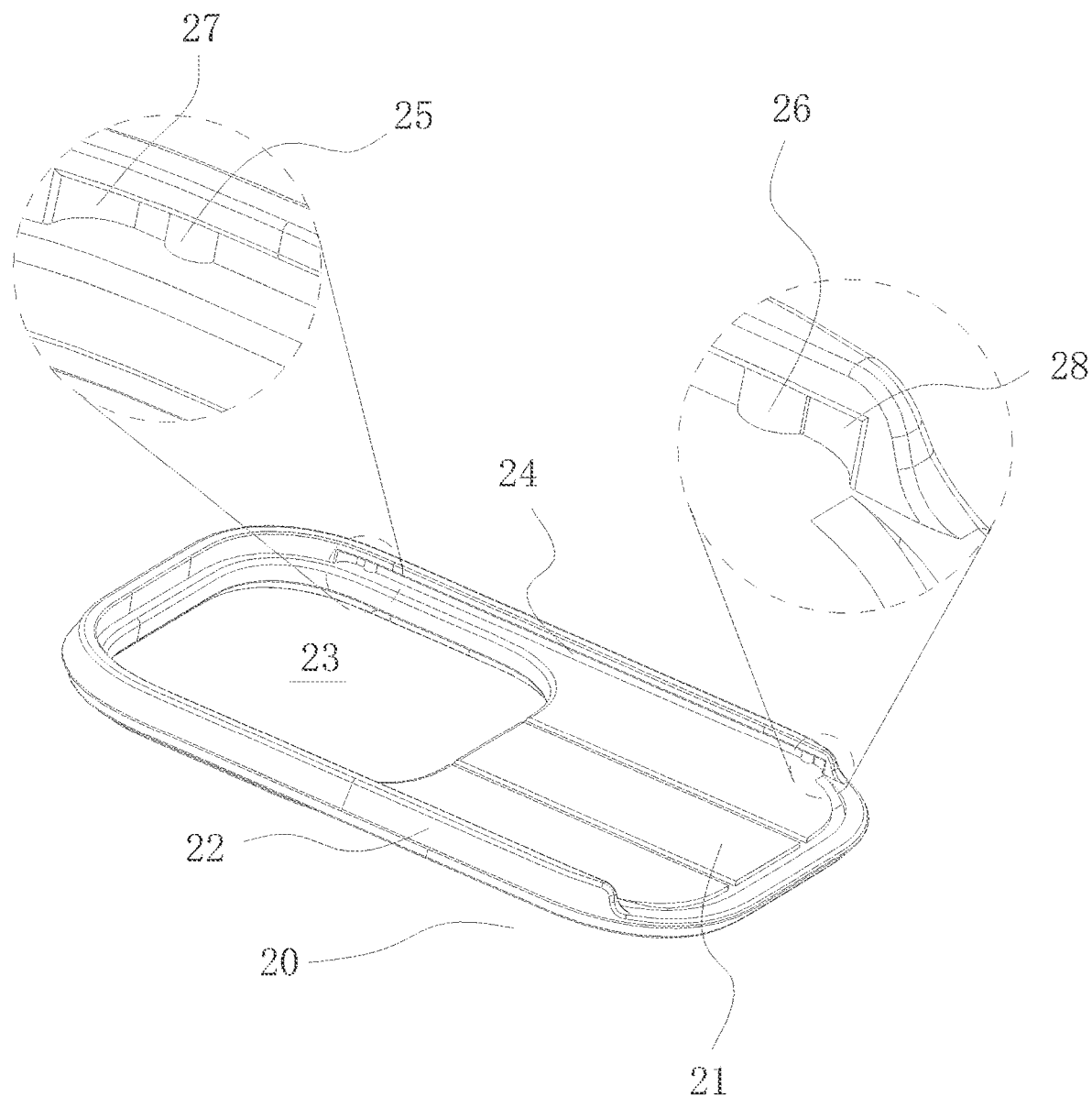
FIG. 3 is a schematic diagram of a single structure of a camera slide base of the mobile phone shell with the camera protection device of the application.

As shown in FIG. 3, the camera slide base 20 is transversely fixed in the upper position of the mobile phone shell body 10, and comprises a base body 21, a camera window 22 arranged on the base body 21 and corresponding to the opening 12 of the mobile phone shell body 10, a window edge 23 connected around the base body 21 and in a U shape, sliding slots 24 arranged on two opposite sides of the base body 21 and located in a part of the window edge 23, a first positioning bulge 25 arranged close to one end of each sliding slot 24 and arranged close to the camera window 22, a second positioning bulge 26 arranged close to the other end of each sliding slot 24 and arranged far away from the camera window 22, a first blocking arc 27 located at one end of each sliding slot 24 and located outside the first positioning bulge 25, and a second blocking arc 28 located at the other end of each sliding slot 24 and located outside the second positioning bulge 26.

Figure 4:
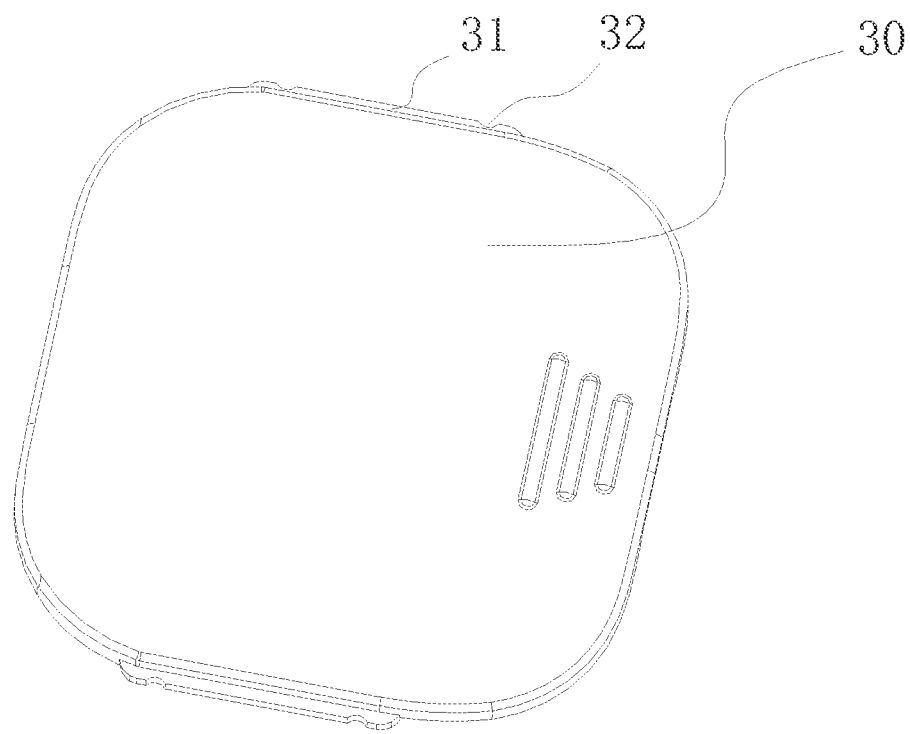
FIG. 4 is a schematic diagram of a single structure of a camera lens protection cover of the mobile phone shell with the camera protection device of the application.

As shown in FIG. 4, the camera lens protection cover 30 is provided with clamping edges 31 located on two sides and two positioning slots 32 located at two ends of each clamping edge 31, and the positioning slots 32 are matched with the corresponding positioning bulges.

Figure 5:
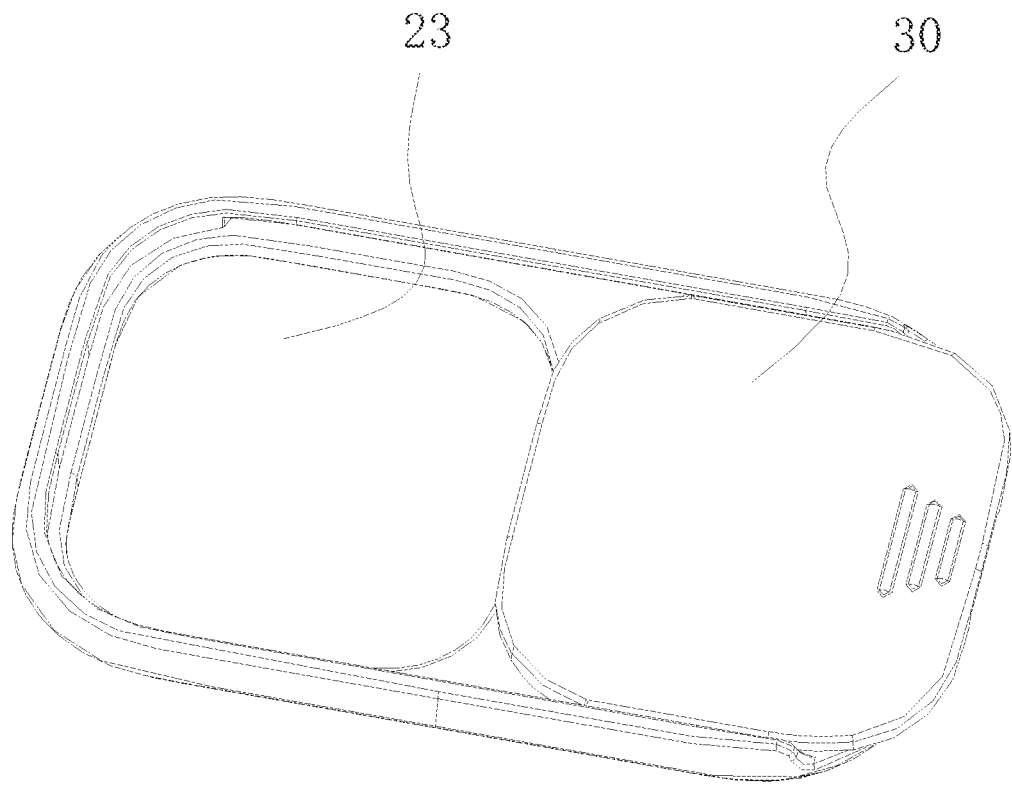
FIG. 5 is a schematic diagram of the mobile phone shell with the camera protection device of the application in a state that the camera lens protection cover is opened.
Figure 6:
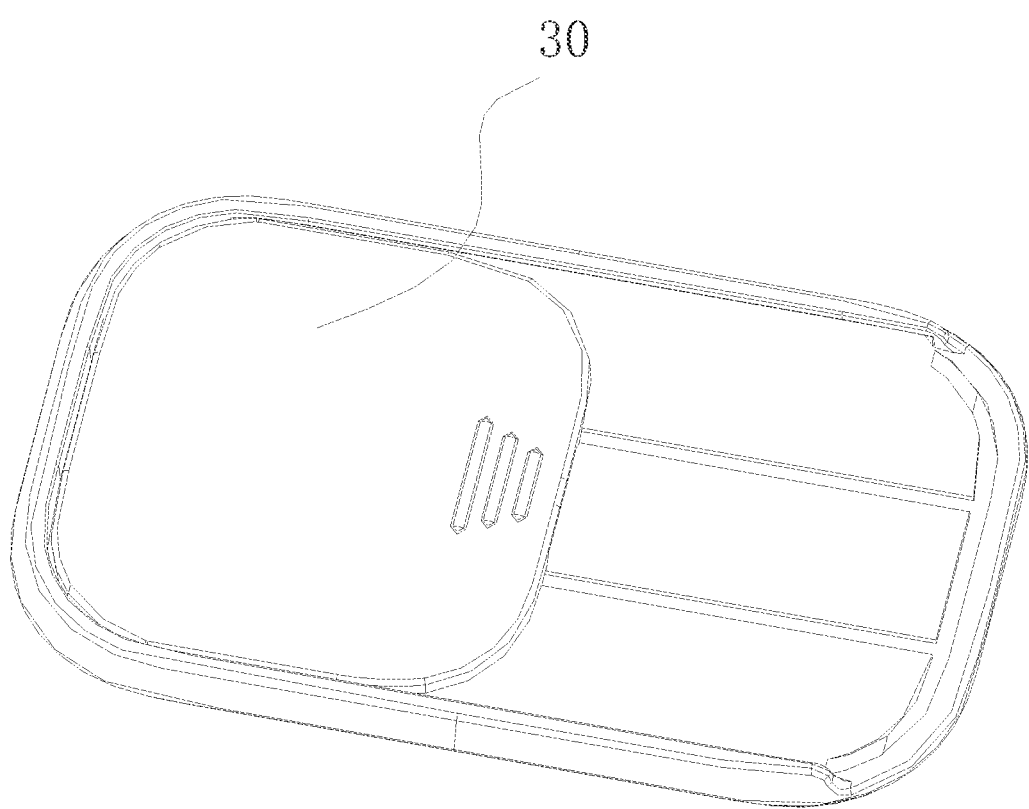
FIG. 6 is a schematic diagram of the mobile phone shell with the camera protection device of the application in a state that the camera lens protection cover is covered.

As shown in FIG. 5, when the mobile phone camera needs to be used, the camera lens protection cover 30 is allowed to slide in the sliding slots 24 to move to an extreme position, and the positioning slots 32 of the camera lens protection cover 30 and the corresponding second positioning bulges 26 of the camera slide base 20 are stuck with each other, so that the camera lens protection cover 30 cannot slide back and forth, and the second blocking arcs 28 cannot slide out of the sliding slots 24 when the camera lens protection cover 30 slides to the extreme position. As shown in FIG. 6, when the mobile phone camera needs to be protected, the camera lens protection cover 30 is allowed to slide in the sliding slots 24 to move to an extreme position, and the positioning slots 32 of the camera lens protection cover 30 and the corresponding first positioning bulges 25 of the camera slide base 20 are stuck with each other, so that the camera lens protection cover 30 cannot slide back and forth, and the first blocking arcs 27 cannot slide out of the sliding slots 24 when the camera lens protection cover 30 slides to the extreme position, so as to cover the camera window 22, thus achieving the function of protecting the mobile phone camera.

The application achieves the function of protecting the mobile phone camera through an assembly structure of the camera lens protection cover and the camera slide base, thus preventing the camera from being scraped or smashed.

The above are only the preferred embodiments of the application, and are not intended to limit the application in any form. Although the application has been disclosed above by the preferred embodiments, the preferred embodiments are not intended to limit the application. Those skilled in the art can make some changes or modifications as equivalent embodiments with equivalent changes by using the technical contents disclosed above without departing from the scope of the technical solutions of the application. However, for the contents not departing from the scope of the technical solutions of the application, any simple amendments, equivalent changes and modifications made to the above embodiments according to the technical essence of the application are still included in the scope of the technical solutions of the application.

The invention claimed is:

1. A mobile phone shell with a camera protection device, comprising a mobile phone shell body, and further comprising a camera slide base fixed on the mobile phone shell body and a camera lens protection cover capable of sliding in the camera slide base, wherein the camera slide base comprises two sliding slots arranged oppositely and positioning bulges arranged at two opposite ends in the sliding slot; and each side of the camera lens protection cover is provided with a positioning slot matched with the positioning bulge, wherein, the positioning bulges include a first positioning bulge and a second positioning bulge, the first positioning bulge arranged close to one end of each sliding slot, and the second positioning bulge arranged close to the other end of each sliding slot, a first blocking arc located at one end of each sliding slot and located outside the first positioning bulge, and a second blocking arc located at the other end of each sliding slot and located outside the second positioning bulge.

2. The mobile phone shell with the camera protection device according to claim 1, wherein the mobile phone shell body is provided with a bulge area and an opening arranged in the bulge area and corresponding to an area in which a mobile phone camera is located.

3. The mobile phone shell with the camera protection device according to claim 2, wherein the bulge area is arranged in an upper position of the mobile phone shell body, and the camera slide base is transversely fixed in the upper position of the mobile phone shell body.

4. The mobile phone shell with the camera protection device according to claim 2, wherein the camera slide base further comprises a base body, a camera window arranged on the base body and corresponding to the opening, and a window edge connected around the base body and in a U shape, and the sliding slots are arranged on two opposite sides of the base body and located in a part of the window edge.

5. The mobile phone shell with the camera protection device according to claim 4, wherein the camera lens protection cover is provided with clamping edges on two sides, and the positioning slots are located at two ends of each clamping edge.

6. The mobile phone shell with the camera protection device according to claim 3, wherein the camera slide base further comprises a base body, a camera window arranged on the base body and corresponding to the opening, and a window edge connected around the base body and in a U shape, and the sliding slots are arranged on two opposite sides of the base body and located in a part of the window edge.

* * * * *